(12) United States Patent
Yamada

(10) Patent No.: US 6,471,423 B1
(45) Date of Patent: Oct. 29, 2002

(54) PRINT CONTROL APPARATUS AND PRINT CONTROL METHOD

(75) Inventor: Koji Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,228

(22) Filed: Dec. 23, 1999

(30) Foreign Application Priority Data

Jan. 5, 1999 (JP) .......................................... 11-000662

(51) Int. Cl.$^7$ ................................................ B41J 11/44
(52) U.S. Cl. .............................. 400/76; 400/61; 400/70
(58) Field of Search ............................. 400/76, 70, 61; 358/1.15

(56) References Cited

U.S. PATENT DOCUMENTS

| | | | | |
|---|---|---|---|---|
| 5,020,005 A | * | 5/1991 | Fujii | 364/519 |
| 5,050,101 A | * | 9/1991 | Kiuchi et al. | 364/519 |
| 5,465,160 A | * | 11/1995 | Kamo et al. | 358/401 |
| 5,737,503 A | * | 4/1998 | Mitani | 395/115 |
| 5,751,924 A | * | 5/1998 | Hamada et al. | 395/115 |
| 6,049,390 A | * | 1/2000 | Notredame et al. | 358/1.15 |
| 6,219,149 B1 | * | 4/2001 | Kawata et al. | 358/1.15 |

FOREIGN PATENT DOCUMENTS

| | | | | |
|---|---|---|---|---|
| JP | 40418226 A | * | 5/1992 | |
| JP | 409204280 A | * | 8/1997 | |
| JP | 2726752 | | 3/1998 | ............. G06F/3/12 |

* cited by examiner

*Primary Examiner*—Andrew H. Hirshfeld
*Assistant Examiner*—Charles H. Nolan, Jr.
(74) *Attorney, Agent, or Firm*—Fitzpatrick, Cella, Harper & Scinto

(57) ABSTRACT

Print control method and apparatus in which when a character and an overlay overlap or when there is a character in an overlay which is spooled on the foreground, it is possible to prevent a periphery of the character from being displayed as a blank image are provided. For this purpose, when the overlay is spooled on the background, a draw command of each print page of the overlay is spooled earlier than a draw command of each print page of a print document. When there is a character draw command in the draw command of the print document and the setting of the character draw command is set to a mode to paint the periphery of the character white, the setting is changed to a mode in which the periphery of the character is not painted white and the character draw command is spooled as a draw command of each print page.

36 Claims, 8 Drawing Sheets

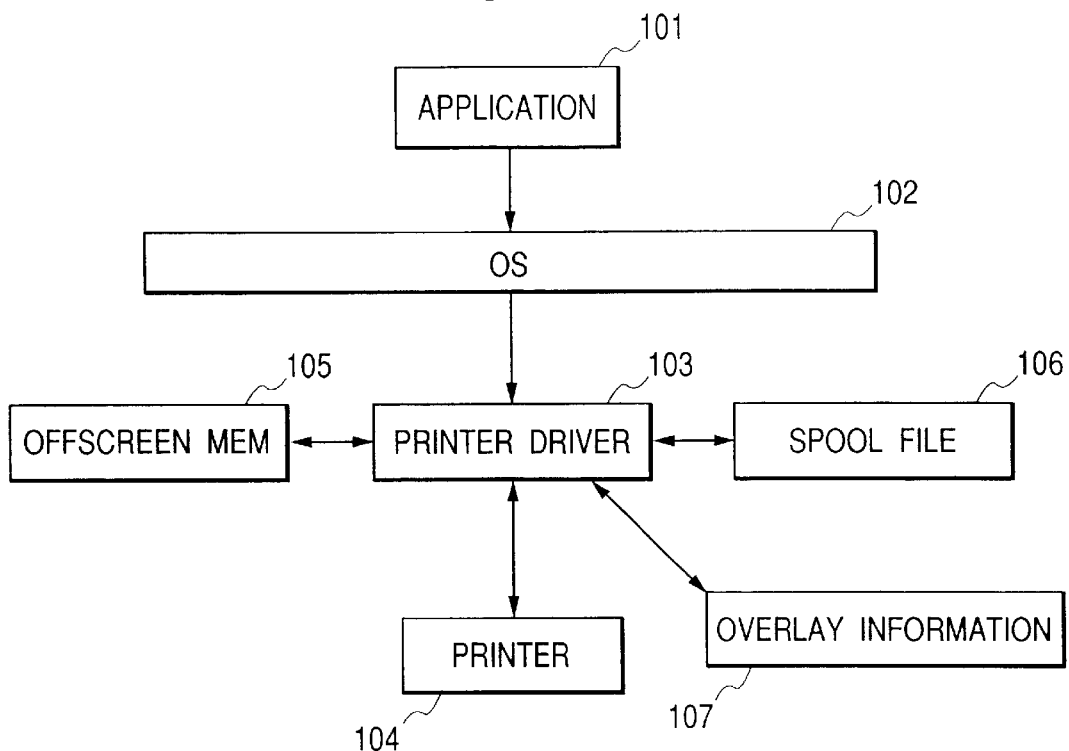
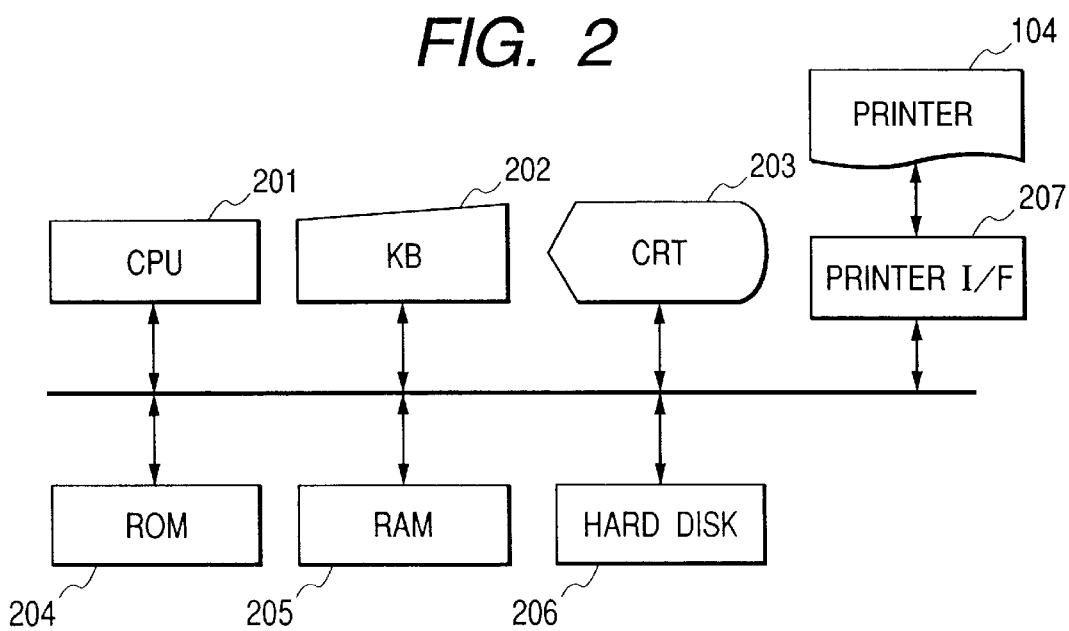

PRINT CONTROL APPARATUS AND PRINT CONTROL METHOD

BACKGROUND OF THE INVENTION

1. Field of the Invention

The invention relates to print control method and apparatus and, more particularly, to print control method and apparatus for performing overlay printing.

2. Related Background Art

In conventional overlay printing on the printer side, when an overlay image (hereinafter, simply referred to as an overlay) is printed on the foreground or background of a target image, for example, there is a method of changing the order of drawing the overlay into an image memory as disclosed in Japanese Patent No. 2726752. Such a method is effective in case of drawing a draw command directly to an image memory as in page printers with low resolution.

According to the conventional method, however, since a process for drawing the overlay and a process for drawing a print document are separated, the processes are complicated.

For example, in case of a high resolution page printer or a color printer, since the image memory does not have a sufficient memory capacity, a banding process is often performed. If the drawing process of the overlay and the drawing process of the print document are separated here, the banding process of the overlay and the banding process of the print document also have to be performed separately. Thus, an amount of processes increases and an overall processing speed decreases.

As shown in the conventional method, in the overlay process on the printer side, as for a document which has previously been made by an application on a host computer, overlay data of a slip or the like has to be registered in the printer. However, when the user wants to print it by a printer without an overlay function, according to the conventional method, added information such as an overlay or the like cannot be added to document data.

Therefore, a method whereby by adding a stamp, a page number, or the like by a printer driver to a print document made by an application, even a printer without the overlay function can obtain the print document added with the stamp or page number is being considered.

However, when the added information is inserted to the print document, since the printer receives it as one print job, it draws and prints the print data in accordance with the given order in the print job. Therefore, the added information has to be added to the print document in consideration of the order.

In the conventional print document, since the presence of the overlay is not known, there is a case where a periphery of a character is painted (hereinafter, the operation to fully paint or paint out is simply referred to as "paint") white in order to distinguish the character easily. With such a method, there is a case where the periphery of the character is displayed as a blank area in a portion where the added information for the background and the print document overlap.

SUMMARY OF THE INVENTION

The invention is made in consideration of the above conventional method and it is an object of the invention to provide print control method and apparatus which can prevent the occurrence of a blank area of a periphery of a character when the character and an overlay overlap or when there is a character in an overlay which is printed on the foreground.

To accomplish the above object, according to the invention, there is provided a print control method comprising the steps of:

in case of spooling an overlay onto the background, spooling a draw command of each print page of the overlay earlier than a draw command of each print page of a print document; and when there is a character draw command in the draw command of the print document and the setting of the character draw command is set to a mode to paint a periphery of the character white, changing the setting to a mode in which the periphery of the character is not painted white and spooling the character draw command as a draw command of each print page.

Further, according to the invention, in case of spooling the overlay onto the foreground, the draw command of each print page of the print document is spooled prior to the draw command of each print page of the overlay, and when there is the character draw command in the draw command of the overlay and the setting of the character draw command is set to a mode to paint the periphery of the character white, the setting is changed to a mode in which the periphery of the character is not painted white and the character draw command is spooled as a draw command of each page.

Further, according to the invention, in case of spooling the overlay onto the background, the draw command of each print page of the overlay is spooled prior to the draw command of each print page of the print document, when there is the character draw command in the draw command of the print document and the setting of the character draw command is set to a mode to paint the periphery of the character white, the setting is changed to a mode in which the periphery of the character is not painted white and the character draw command is spooled as a draw command of each print page, in case of spooling the overlay onto the foreground, the draw command of each print page of the print document is spooled prior to the draw command of each print page of the overlay, and when there is the character draw command in the draw command of the overlay and the setting of the character draw command is set to a mode to paint the periphery of the character white, the setting is changed to a mode in which the periphery of the character is not painted white and the character draw command is spooled as a draw command of each page.

BRIEF DESCRIPTION OF THE DRAWINGS

FIG. 1 is a hierarchical diagram of a system of the invention;

FIG. 2 is a block diagram showing a construction of hardware according to an embodiment;

DETAILED DESCRIPTION OF THE PREFERRED EMBODIMENTS

Figure 3:
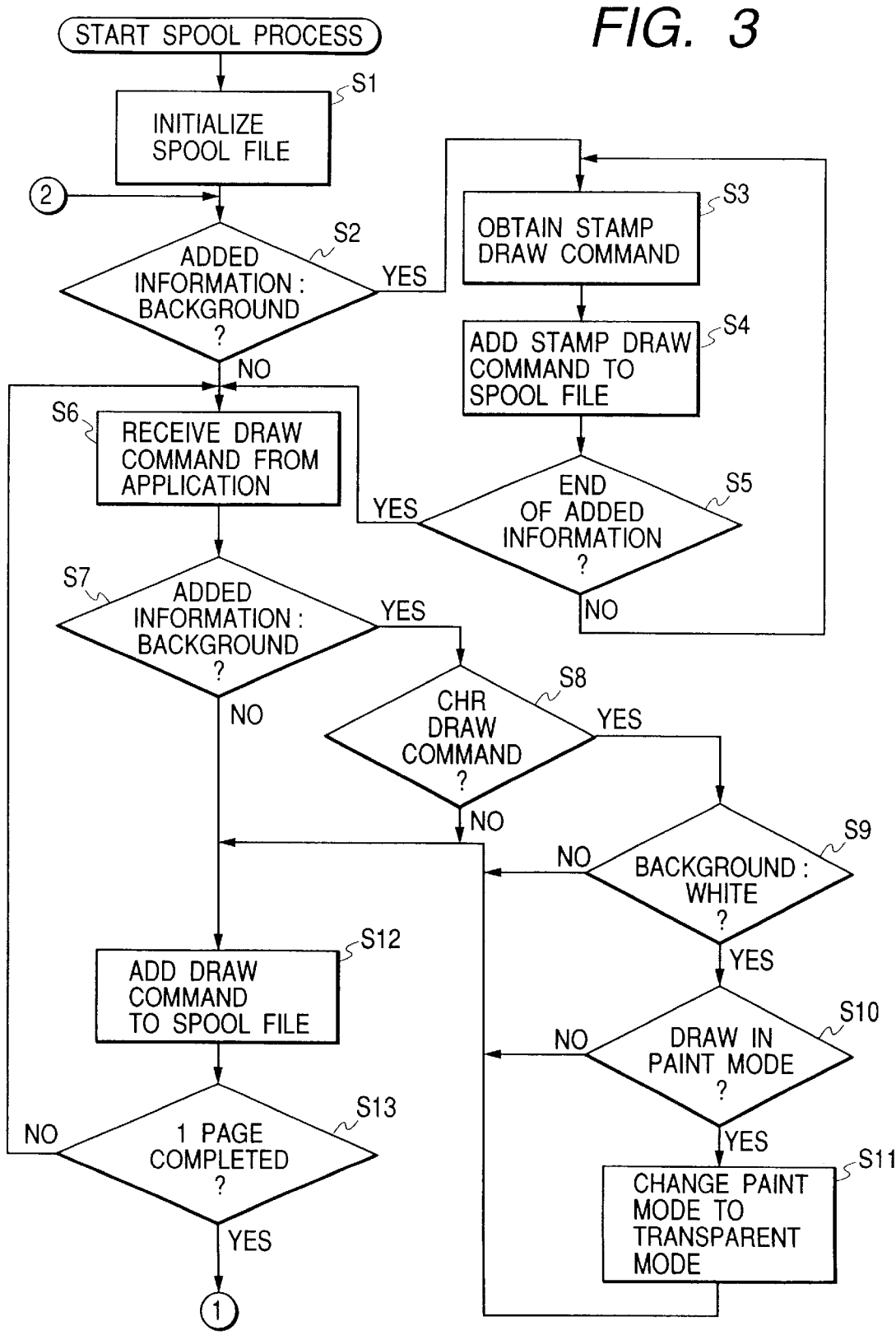
FIG. 3 is a flowchart for explaining processes according to the embodiment 1 of the invention.

Preferred embodiments of the invention will now be described in detail hereinbelow with reference to the drawings.

[First Embodiment]

<Description of Terms>

Main terms in the embodiments will be first described.

"Spool process": process for storing a draw command into a file

"Spool file": file stored by the spool process (in the embodiments, even in the case where the draw command has been stored in a memory in a system without an external storing apparatus, it is called a file)

"Banding process": an image is divided and a draw transfer process is executed

"Band": image divided by the banding process

"Image memory": memory space in which an image can be developed in a manner similar to that of a picture plane although it is not displayed on the picture plane <Outline of Processes of Printer Driver>

An outline of processes of a printer driver in the embodiment will now be described.

FIG. 1 is a hierarchical diagram of a printer control system to draw an overlay and a print document according to the embodiment.

In FIG. 1, reference numeral 101 denotes an application program; 102 an OS (Operating System); 103 a printer driver; 104 a printer; 105 an offscreen (image memory); 106 a spool file; and 107 overlay information (stamp, added information).

As will be obvious from FIG. 1, the printer driver 103 is located in a lower layer of the OS 102 of a host computer, receives a draw command from the application program 101, converts it to a print command which can be processed by the printer 104, and transfers it to the printer 104 after that.

Particularly, a printer to print a raster image does not have a processing function of a complicated draw command as a processing function. Therefore, a draw command from the application program 101 is once stored into the spool file 106. Upon transfer of the draw command, the printer driver 103 forms a bit map image by the image memory 105 by using the stored spool file 106 and transfers it to the printer 104.

When the bit map image is formed, if a memory capacity of a host computer is small, an image is divided and drawing and transfer processes are executed.

Although the embodiment 1 is described with respect to a raster printer as an example, even a page printer having an advanced PDL (Page Description Language) has substantially the same processing construction in terms of a meaning that a PDL is spooled in a memory in the page printer, an image is drawn in an image memory, and the contents in the image memory are transferred to a printer engine.

<Construction of Hardware>

A constructional example of hardware to realize the embodiment 1 will now be described with reference to FIG. 2.

In the construction of FIG. 2, reference numeral 201 denotes a control unit (hereinafter, referred to as a CPU) to perform a control according to the embodiment 1; 202 a keyboard to input various data; 203 a color display to display image data stored in an RAM (random access memory) 205; and 204 an ROM in which a control procedure to control the whole apparatus and other necessary processing procedures, data, information, and the like have previously been stored. Reference numeral 205 denotes the RAM which is used as a work memory; 206 a hard disk in which various data and programs are stored; 207 a printer interface to transmit print data; 104 the printer mentioned above; and 209 a data bus which is used to transfer the various data. An application program, a printer driver, and the like have been stored in the hard disk 206. They are loaded into the RAM 205 and controlled by the CPU 201. The printer 104 may be connected via a network (LAN).

<Spool Process>

A spool process of the printer driver according to the embodiment 1 will now be described hereinbelow with reference to flowcharts shown in FIGS. 3 and 4. In the picture plane expression of the embodiment, the overlay is expressed as "added information".

Figure 4:
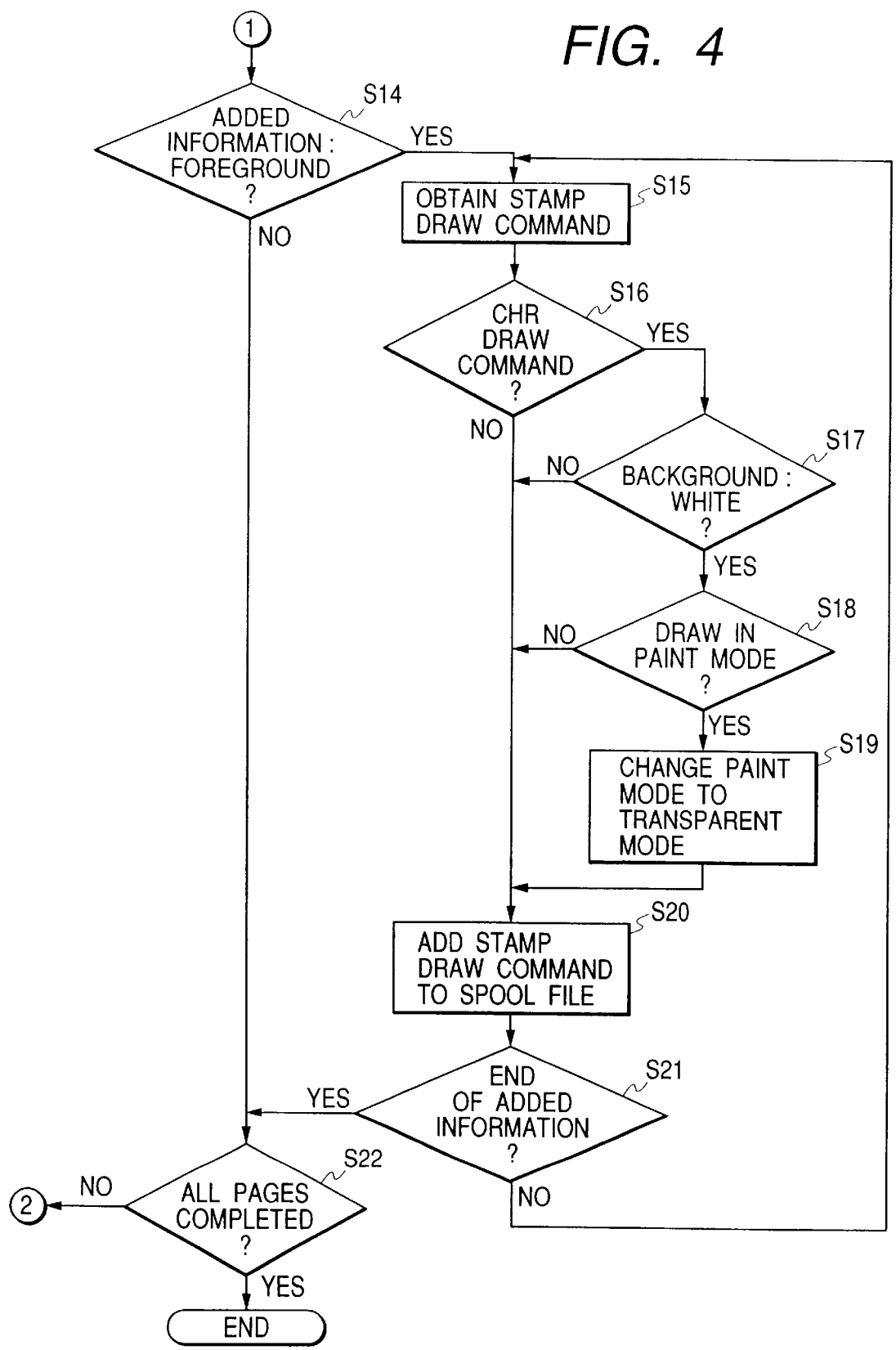
FIG. 4 is a flowchart for explaining processes according to the embodiment 1 of the invention.

FIGS. 3 and 4 show processes such that the printer driver receives the print command from the application and stores it into a file called a spool file. The conversion to convert it to an actual print command is executed after those processes. It is assumed that the user previously performs the print setting shown in FIGS. 8 and 9 by a property of the printer driver before printing.

Figure 8:
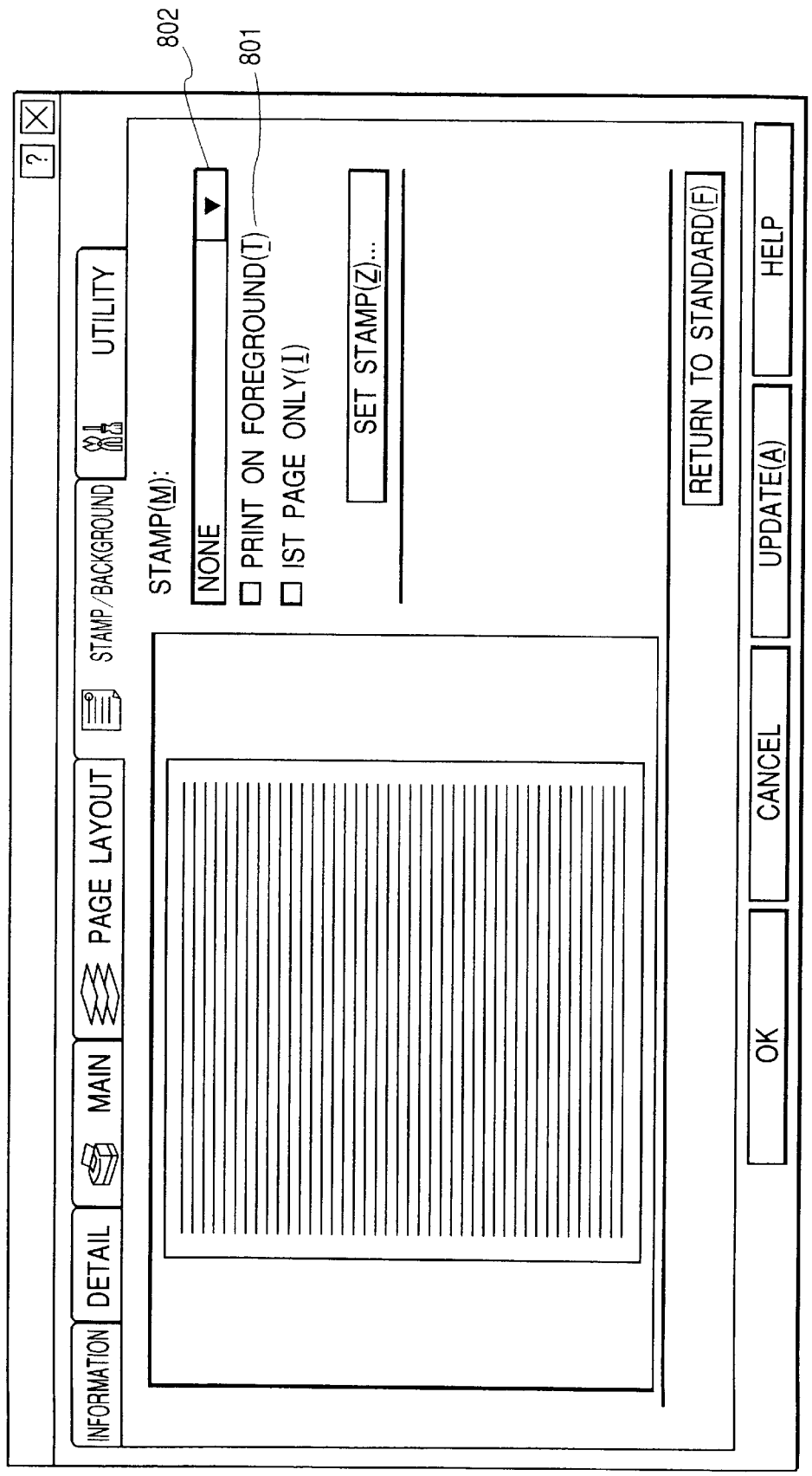
FIG. 8 shows an example of a picture plane of a printer driver according to the embodiments 1 and 2 of the invention and is a diagram showing a state where no overlay is used.
Figure 9:
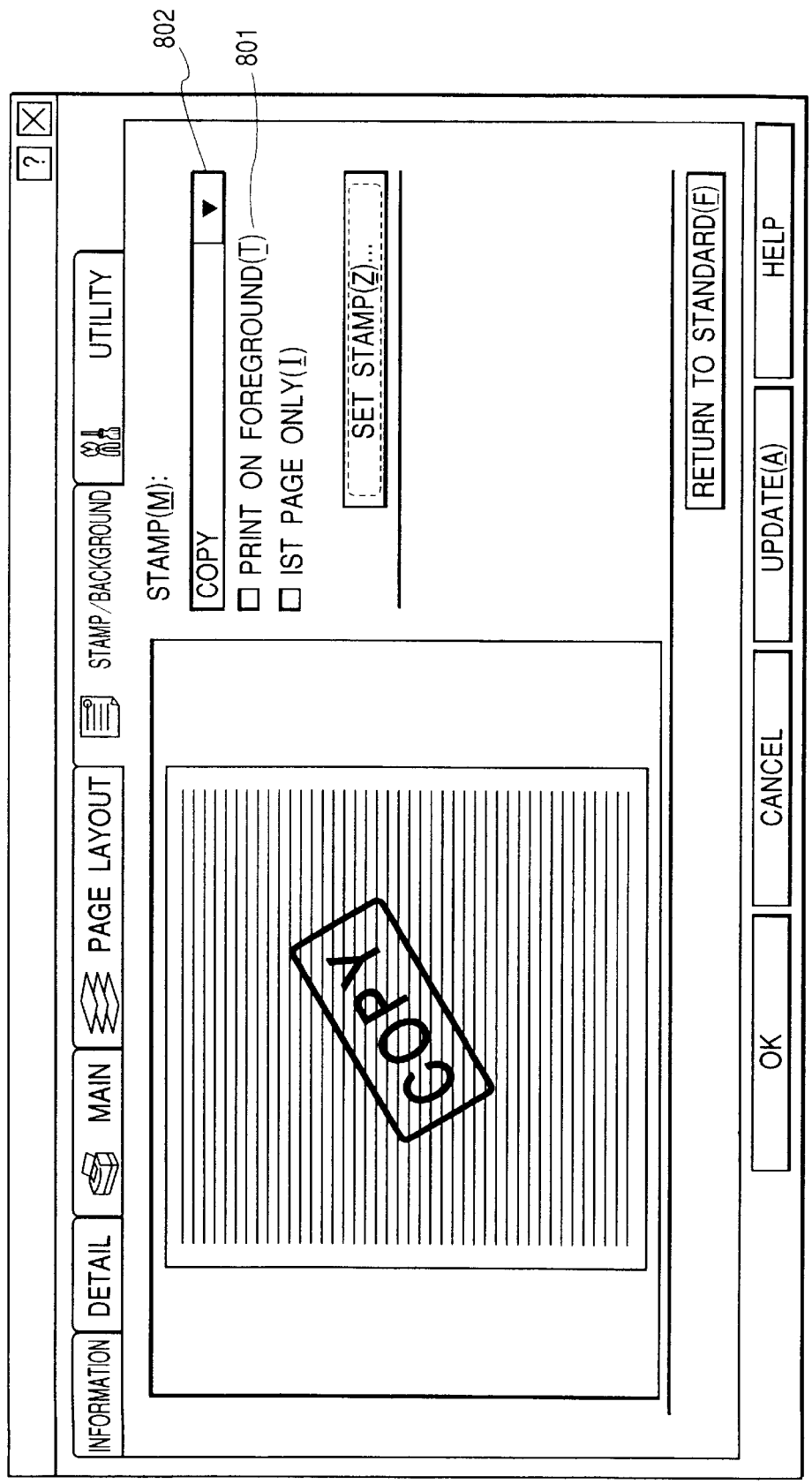
FIG. 9 shows an example of a picture plane of a printer driver according to the embodiments 1 and 2 of the invention and is a diagram showing a state where an overlay is printed on the background of a document.

First, in step S1, the printer driver initializes the spool file. Steps S2 to S5 show processes (FIG. 3) for spooling added information (stamp) as a background of a document. In step S2, the printer driver discriminates a check state of a "print on foreground" check box 801 in FIG. 8. If the check box is not checked, it is determined that the added information (stamp) is printed on the background. If the check box is checked, it is decided that the added information is printed on the foreground. If a "stamp" menu 802 in FIG. 8 is "none", it is determined that the added information is not printed. In case of printing the added information onto the background, the processing routine advances to step S3. When the added information is printed on the foreground or the added information is not printed, step S6 follows.

In step S3, the printer driver extracts a stamp draw command selected in the "stamp" menu 802 in FIG. 8 from the overlay information 107 in FIG. 1. Subsequently, the processing routine advances to step S4 and the stamp draw command extracted in step S3 is added to the spool file. Step S5 follows and whether the added information comprises a plurality of draw commands or not is discriminated. If the added information is not finished, the processing routine is returned to step S3. If it has been finished, step S6 follows. In this way, the added information is spooled on the background of the document.

This is because since the printer driver performs a rasterization in accordance with the reading order from the spool file, the first spooled added information is read out and drawn first. (Step of spooling document).

In step S6, the printer driver receives a draw command for print data from the application. Specifically speaking, the OS finely divides the draw command sent from the application to the OS and calls a DDI (Device Driver Interface) of the printer driver. The called printer driver stores the contents of the kind and argument of the called DDI into the memory. In step S7, the printer driver discriminates whether the added information has been spooled on the background or not. When the added information is spooled on the background, step S8 follows in order to perform a blank preventing process for preventing a character from being displayed as a blank area. If NO, step S12 follows.

Step S8 relates to a case where the overlay was spooled on the background and the printer driver discriminates whether the draw command from the application is a character draw command or not. Specifically speaking, whether an "ExtTextOut" function of DDI has been called or not is discriminated in step S6. The "ExtTextOut" function is one of the DDIs which the printer driver has. When the "ExtTextOut" function is called, step S9 follows. If it is not called, step S12 follows.

In step S9, whether the command received in step S6 is a command to draw the background of a character white as a character train drawing or not is discriminated. Specifically speaking, a check is made to see if a "bkColor" member of an argument "lpDrawMode" structure of the "ExtTextOut" function stored in step S6 is "0xFFFFFF (white)". If the "bkColor" member is not "0xFFFFFF", step S12 follows. If the "bkColor" member is "0xFFFFFF", step S10 follows. In step S10, whether the character is drawn in a paint mode or not is discriminated. Specifically speaking, whether an "ETO_OPAQUE" flag of an argument "wOptions" has been set to the high level or not is discriminated. If the flag is not at the high level, step S12 follows. If the flag is at the high level, it is determined that the periphery of the character is painted white, and step S11 follows. In step S11, the "ETO_OPAQUE" flag of the argument "wOptions" stored in step S6 is cleared. If the "bkMode" member of the "lpDrawMode" structure is "OPAQUE", by changing it to "TRANSPARENT", the setting such that the periphery of the character of the character draw command is painted white is changed to the setting such that the periphery of the character is painted as a transparent image. After that, step S12 follows.

In step S12, the printer driver adds the draw command stored in the memory to the spool file. Step S13 follows and the printer driver discriminates whether the drawing of one page has been finished or not. If the drawing of the image of one page has been finished, step S14 follows. If it is not finished yet, the processing routine is returned to step S6. (Process for spooling added information onto the foreground of drawing data of application: FIG. 4)

In step S14, the printer driver discriminates a check state of the "print on foreground" check box 801 in FIG. 8. If the check box is not checked, it is determined that the added information is printed on the background. If the check box is checked, it is decided that the added information is printed on the foreground. If the "stamp" menu 802 in FIG. 8 is "none", it is determined that the added information is not printed. If the added information is printed on the foreground, step S15 follows. If NO, step S22 follows. In step S15, the printer driver extracts the stamp draw command selected in the "stamp" menu in FIG. 8 from the overlay information 107 in FIG. 1. Subsequently, in step S16, the printer driver discriminates whether the stamp draw command is a character draw command or not. That is, whether there is a character drawing in the added information (stamp) or not is discriminated. If the stamp draw command is the character draw command, step S17 follows. If NO, step S20 follows.

In step S17, the printer driver discriminates whether the background of the character is drawn white as a character train drawing or not. If the drawing mode has been set to a mode to draw in white, step S18 follows. If NO, step S20 follows. In step S18, whether the character is drawn in the paint mode or not is discriminated. If it is drawn in the paint mode, step S19 follows. If NO, step S20 follows. In step S19, the setting to paint the periphery of the character white is changed to the mode to draw the periphery of the character as a transparent image. The processing routine advances to step S20. The stamp draw command is added to the spool file. Subsequently, step S21 follows and the printer driver discriminates whether the added information comprises a plurality of draw commands or not and discriminates whether the added information has been finished or not. If YES, step S22 follows. If NO, the processing routine is returned to step S15.

In step S22, the printer driver discriminates whether the spool process has been finished with respect to all pages of the print document or not. If the spool process of all pages is not finished yet, step S2 follows. If the spool process of all pages has been finished, the spool process is completed.

Figure 7:
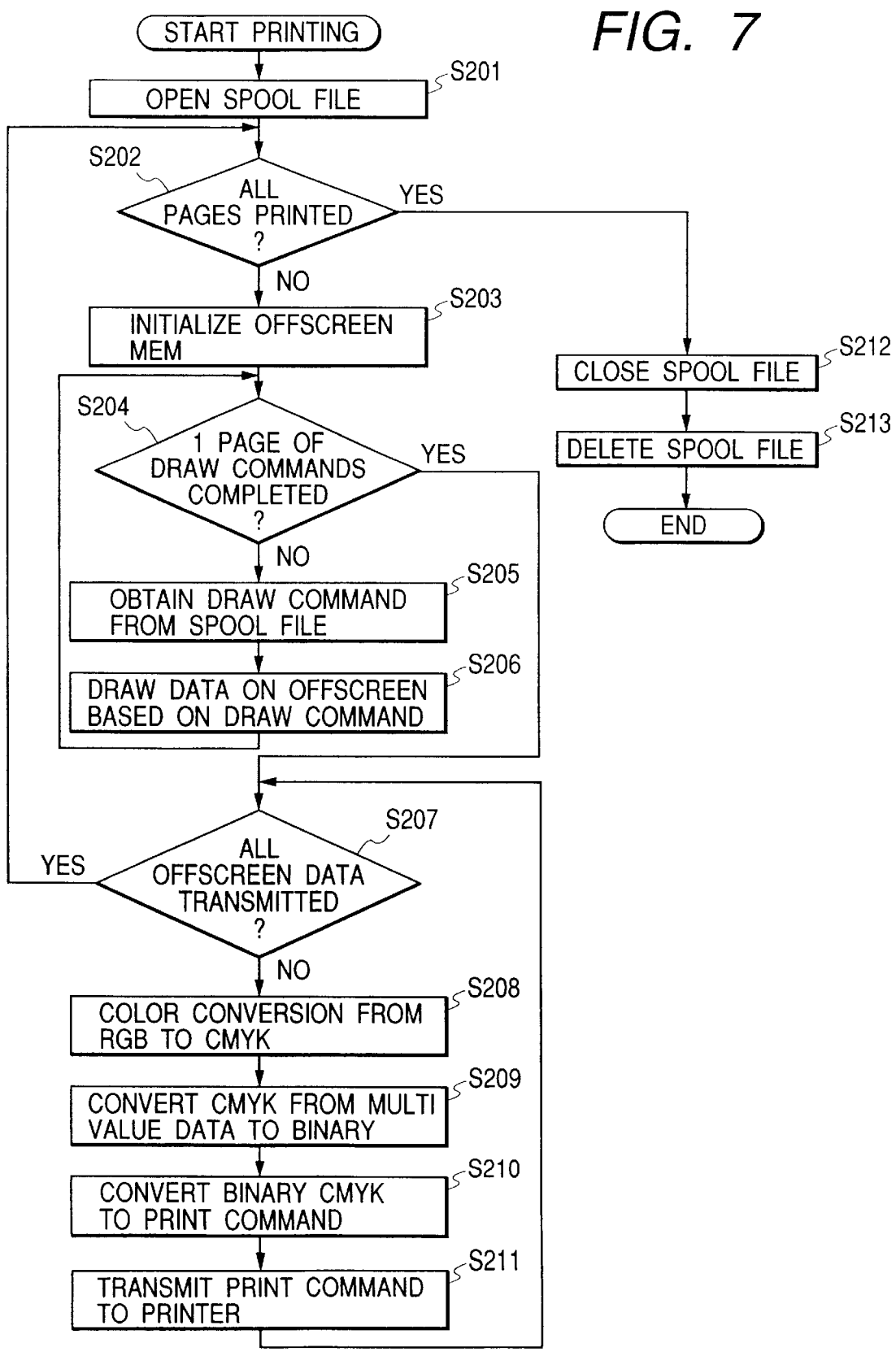
FIG. 7 is a flowchart for explaining a printing process according to the embodiment 1 of the invention.

The printing process of the printer driver in the embodiment 1 will now be described with reference to a flowchart shown in FIG. 7. The printing process is similar to the ordinary printing process and a rasterizing process, a color converting process, a binarizing process, and a command converting process are executed. Any special process for the overlay is not necessary.

In step S201, the printer driver 103 opens the spool file 106 formed by the spool process. In step S202, the printer driver 103 discriminates whether all pages have been printed or not. If all pages have been printed, step S212 follows. If NO, step S203 follows.

In step S203, the offscreen memory is initialized. In step S204, whether the draw commands of one page have been finished or not is discriminated. If the draw commands of one page have been finished, step S207 follows. If NO, step S205 follows. In step S205, the draw command is obtained from the spool file. In step S206, data is drawn in the offscreen memory in accordance with the obtained draw command.

The printer driver 103 extracts the draw commands from the spool file 106 and draws in the offscreen memory 105. The draw commands (including a print data draw command and a stamp draw command) are obtained from the spool file 106 in accordance with the order in which the draw commands are spooled in the spool file 106. That is, the draw command which was first spooled is first read out and is drawn first as a result. Therefore, the added information to be drawn on the background had already been spooled in the spool file 106 earlier than the draw command received from the application, the added information to be drawn on the background is first read out to the printer driver and drawn in the offscreen memory 105.

The drawing by the printer driver 103 into the offscreen memory 105 is performed by overwriting. That is, with respect to a portion where the draw commands overlap, the draw command to be drawn later has a priority. As a related art, there is also a technique such that the added information such as a stamp or the like is drawn later than the draw command from the application, in case of printing on the foreground at the time of drawing, the draw command is overwritten as it is, in case of printing on the background, an ROP process (raster operation: a kind of logical drawing) is executed, and the OR is got, thereby making it possible to prevent the original data from being erased. In this case, even if the mode to paint the periphery of the character as a draw command from the application white is designated, the added information is not erased. According to this method, however, for example, when the user wants to draw a green background onto the background of a red character, by getting the OR, the character is drawn in yellow. That is, there is an inconvenience such that the output desired by the user is not obtained. Therefore, in the invention, the drawing is performed by overwriting and the drawing order is taken into consideration. In addition to the drawing order, the attribute of the periphery of the character is further controlled.

In step S207, whether the draw data of all lines on the offscreen has been converted to the print commands and transmitted or not is discriminated. If the draw data of all lines has been transmitted, the processing routine is returned to step S202. If NO, step S208 follows. In step S208, the (RGB→CMYK) color conversion of the offscreen is performed. In step S209, the converted multivalue CMYK data is converted to binary data. In step S210, the converted CMYK binary data is converted to a print command. In step S211, the converted print command is transmitted to the printer. After that, the processing routine is returned to step S207.

In step S212, the spool file after completion of the printing process is closed. In step S213, the spool file is deleted.

[Second embodiment]

The embodiment 2 of the invention relates to an example of using a bit map as added information instead of the draw command.

Figure 5:
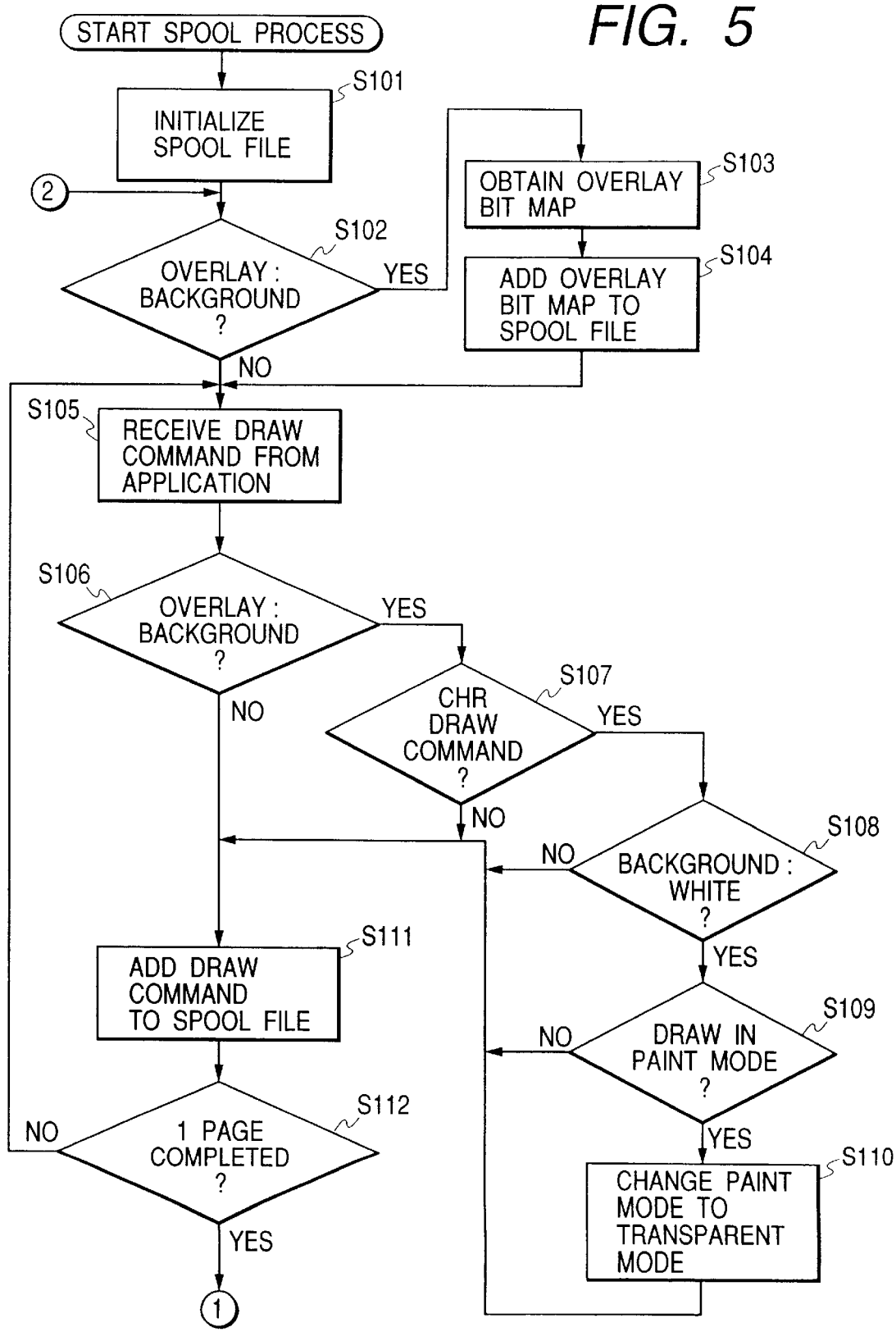
FIG. 5 is a flowchart for explaining processes according to the embodiment 2 of the invention.
Figure 6:
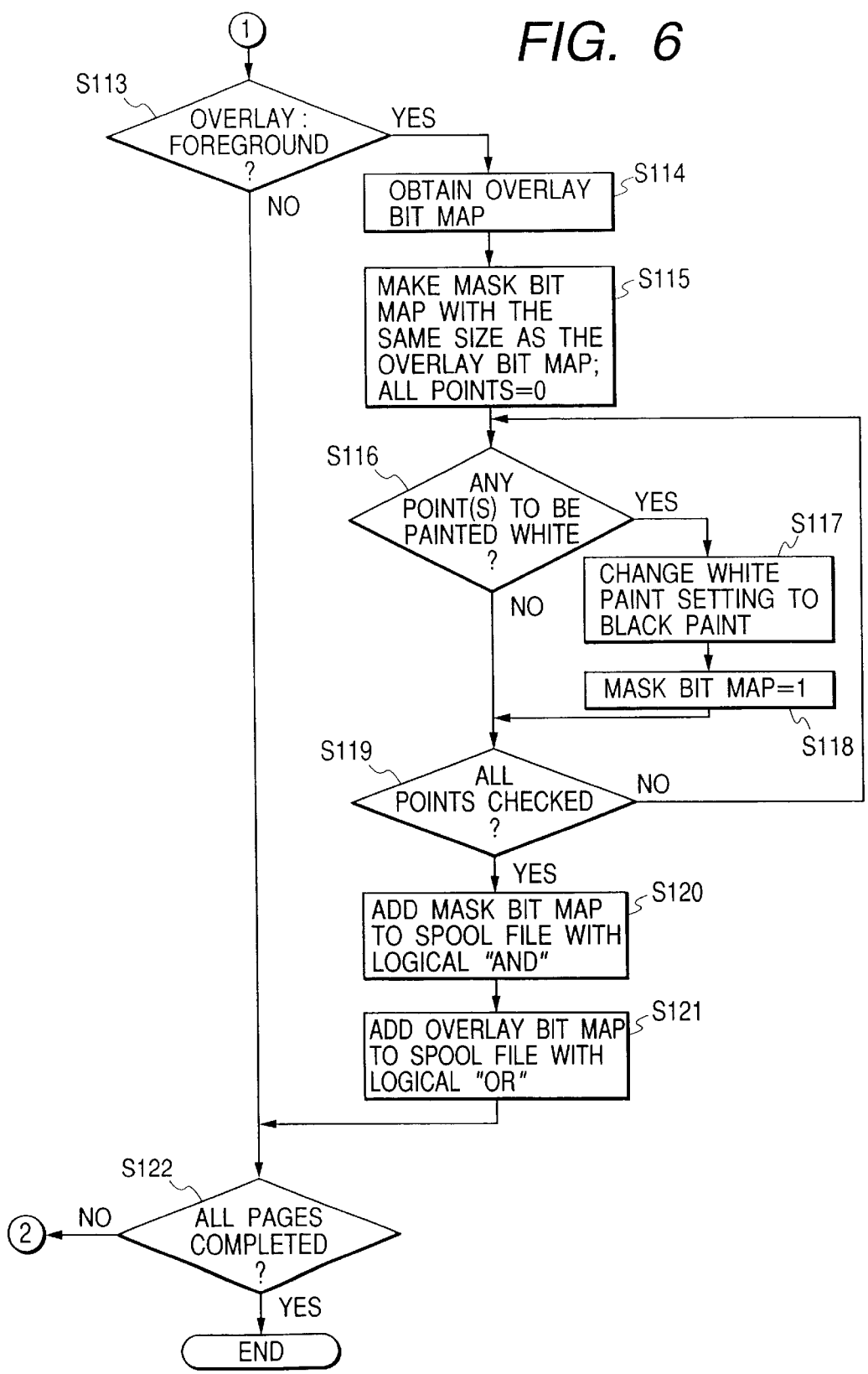
FIG. 6 is a flowchart for explaining processes according to the embodiment 2 of the invention.

Processes of an overlay using a bit map according to the embodiment 2 will now be described hereinbelow with reference to flowcharts of FIGS. 5 and 6.

<Spool Process>

First, in step S101, the printer driver performs an initializing process of the spool file. Steps S102 to S104 show processes (FIG. 5) for spooling an overlay (bit map) onto the background of a document. That is, in step S102, a check state of the "print on foreground" check box 801 in FIG. 8 is discriminated. If the check box 801 is not checked, it is determined that the overlay is printed on the background. If the check box is checked, it is decided that the overlay is printed on the foreground. If the "stamp" menu 802 in FIG. 8 is "none", it is determined that the overlay is not printed. In case of printing the overlay onto the background, the processing routine advances to step S103. When the overlay is printed on the foreground or the overlay is not printed, step S105 follows.

In step S103, the printer driver extracts an overlay bit map corresponding to the overlay image selected in the "stamp" menu 802 in FIG. 8 from the overlay information 107 in FIG. 1. Subsequently, the processing routine advances to step S104 and the printer driver adds the extracted overlay bit map to the spool file.

(Step of Spooling Document)

In step S105, the printer driver receives the draw command from the application. Specifically speaking, the OS finely divides the draw command sent from the application to the OS and calls a DDI (Device Driver Interface) of the printer driver. The called printer driver stores the contents of the kind and argument of the called DDI into the memory. Subsequently, step S106 follows and the printer driver discriminates whether the overlay has been spooled on the background or not. When the overlay is spooled on the background, step S107 follows in order to perform a blank preventing process for preventing a character from being displayed as a blank area. If NO, step S111 follows. In step S107, whether the draw command received from the application is a character draw command or not is discriminated. Specifically speaking, whether the "ExtTextOut" function of DDI has been called or not is discriminated in step S105. The "ExtTextOut" function is one of the DDIs which the printer driver has. When the "ExtTextOut" function is called, it is determined that the command is the character draw command. If the command is the character draw command, step S108 follows. If NO, step S111 follows.

In step S108, whether the background of the character is drawn white as a character train drawing or not is discriminated. Specifically speaking, a check is made to see if the "bkColor" member of the argument "lpDrawMode" structure of the "ExtTextOut" function stored in step S105 is "0xFFFFFF (white)". If the "bkColor" member is not "0xFFFFFF", step S111 follows. If the "bkColor" member is "0xFFFFFF", step S109 follows. In step S109, whether the character is drawn in the paint mode or not is discriminated on the basis of a flag "ETO_OPAQUE" of an argument "wOptions". If the flag is not at the high level, step S111 follows. If the flag is at the high level, it is determined that the periphery of the character is painted white, and step S110 follows. In step S110, the "ETO_OPAQUE" flag of the argument "wOptions" stored in step S105 is cleared. If the "bkMode" member of the "lpDrawMode" structure is "OPAQUE", by changing it to "TRANSPARENT", the setting such that the periphery of the character of the character draw command is painted white is changed to the setting such that the periphery of the character is painted as a transparent image. After that, step S111 follows. The printer driver adds the draw command stored in the memory to the spool file. Subsequently, in step S112, the printer driver discriminates whether the drawing of one page has been finished or not. If the drawing of one page has been finished, step S113 follows. If NO, the processing routine is returned to step S105.

Processes for spooling the overlay onto the foreground of the application will now be described with reference to the flowchart of FIG. 6.

In step S113, the printer driver discriminates a check state of the "print on foreground" check box 801 in FIG. 8. If the check box 801 is not checked, it is determined that the overlay is printed on the background. If the check box 801 is checked, it is decided that the overlay is printed on the foreground. If the "stamp" menu 802 in FIG. 8 is "none", it is determined that the overlay is not printed. In case of printing the overlay onto the foreground, the processing routine advances to step S114. If NO, step S122 follows. In step S114, the printer driver extracts the overlay bit map selected in the "stamp" menu in FIG. 8 from the overlay information 107 in FIG. 1. In step S115, a bit map for masking of the same size as that of the overlay bit map obtained in step S114 is formed. The masking bit map which is formed here is handled as black or white binary data. In the masking bit map, all points are designated to "0 (black)". The processing routine advances to step S116 and the printer driver discriminates whether a point of coordinates (x, y) of the overlay bit map has been set to the mode for printing in white or not. If the point of the coordinates (x, y) of the overlay bit map is painted white, step S117 follows. If NO, step S119 follows.

In step S117, the printer driver changes the setting to paint the point of the coordinates (x, y) of the overlay bit map white to "0x000000 (black)". This replacement is a process to prevent the data which has already been spooled from being erased when an OR process (step S121) is executed later. In step S118, the printer driver sets the color of the coordinates (x, y) of the masking bit map corresponding to the coordinates of the overlay bit map whose mode has been set to the mode to paint in white is set to "1 (white)". Thus, a masking bit map in which only the peripheral portion of the character of the bit map drawn as, for example, "COPY" is inverted to white is formed. The processing routine advances to step S119 and the printer driver discriminates whether all points of the overlay bit map have been checked or not. If the checking operation of all points is not finished yet, the processing routine is returned to step S116. If the checking operation of all points has been finished, step S120 follows.

In step S120, the printer driver adds the masking bit map to the spool file so as to draw in a logical mode "AND". With this method, with respect to portions overlapped with the stamp (already added to the spool file) of the draw command formed by the application, only the peripheral portion of the character of the bit map of the stamp is drawn. In step S121, the printer driver adds the overlay bit map to the spool file so as to draw the overlay bit map by the "OR". At the time of drawing, since the portions overlapped with the overlay bit map of the stamp ought to remain as data, if the "OR" process is performed, the data regarding portions which does not overlap with the stamp of the draw command formed by the application remain. In step S122, whether the process for all pages of the print document has been finished or not is discriminated. If the process for all pages is not finished, step S102 follows. If the process for all pages has been finished, the spool process has been finished.

The printing process of the printer driver according to the embodiment 2 is substantially the same as that in the embodiment 1.

[Third Embodiment]

The above embodiments have been described with respect to the control for sending the print data based on the image data obtained by rasterizing on the host computer side to the printer (ink jet printer or host base printer).

In the third embodiment, processes of a host computer in the case where a printer language such as a page description language or the like is transmitted to the printer and the printer interprets the printer language and performs the printing process will now be described.

Processes in FIGS. 2 and 3 for spooling the added information of the draw command formed by the application, the stamp, and the like are similar to those mentioned above. The control in FIG. 7 is changed.

In the processes in the third embodiment, the control in steps S203 to S211 is not performed but the draw commands are sequentially read out from the spool file, the draw commands (the draw command of the added information and the original draw command received from the application) are analyzed, and the original draw command overlapped with the draw command of the added information is discriminated. If the original draw command overlapped with the added information exists, the following processes are executed.

Whether the relevant added information is "print on background" or "print on foreground" is discriminated. In case of "print on background", the printing order is designated so as to overwrite the original draw command onto the added information. If the added information is "print on foreground", the printing order is designated so as to overwrite the added information onto the original draw command. After the drawing attribute of the printing order is set in this manner, the print data converted to the printer language of the page description language is formed on the basis of each draw command and outputted to the printer.

By controlling in this manner, even for the printer which interprets the printer language and performs the printing process, the added information such as a stamp or the like can be added to the print document (original draw command) formed by the application. In this instance, even when the mode to print on the foreground of the print document or the mode to print on the background thereof is designated, the printing process can be performed on the printer side without displaying the periphery of the character as a blank image.

Although the flow of shifting to the printing process after completion of the spool process of all pages has been described in the embodiments 1 and 2, the invention also incorporates an embodiment in which the spool process and the printing process are repeated on a page unit basis.

The invention can be applied to a system comprising a plurality of equipment (for example, a host computer, interface equipment, a reader, a printer, etc.) or an apparatus (for example, a copying apparatus, a facsimile apparatus, or the like) comprising one equipment.

The object of the invention can be accomplished by a method whereby a memory medium on which program codes of software to realize the functions of the embodiments mentioned above have been recorded is supplied to a system or apparatus and a computer (or a CPU or MPU) of the system or apparatus reads out and executes the program codes stored in the memory medium.

In this case, the program codes themselves read out from the memory medium realize the functions of the embodiments mentioned above, and the memory medium in which the program codes have been stored constructs the invention.

As a memory medium to supply the program codes, for example, it is possible to use a floppy disk, a hard disk, an optical disk, a magnetooptic disk, a CD-ROM, a CD-R, a magnetic tape, a nonvolatile memory card, an ROM, or the like.

The invention incorporates not only a case where the functions of the embodiments mentioned above are realized by executing the program codes read out by the computer but also a case where the OS (Operating System) or the like which operates on the computer executes a part or all of the actual processes on the basis of instructions of the program codes and the functions of the embodiments mentioned above are realized by those processes.

Further, the invention also incorporates a case where the program codes read out from the memory medium are written into a memory provided for a function expanding board inserted into a computer or a function expanding unit connected to the computer and, thereafter, a CPU or the like provided for the function expanding board or function expanding unit executes a part or all of the actual processes on the basis of instructions of the program codes, and the functions of the embodiments mentioned above are realized by those processes.

According to the invention as described above, the periphery of the character in the document overlapped with the overlay is printed without being displayed as a blank image.

Even when an overlay having a character exists on the foreground, the periphery of the character is not displayed as a blank image.

Further, even if the overlay exists on the background or foreground, it is possible to prevent the periphery of the character from being displayed as a blank image. Therefore, the overlay can be positioned on the foreground or background of the print document without providing any special drawing processing function.

What is claimed is:

1. An information processing method carried out in an information processing apparatus which functions as a host computer to add added information to a print document formed by an application and to generate print data to be printed by a printer, comprising:

an inputting step of inputting, via a print setting window of a printer driver, settings of adding added information to a print document formed by the application;

a discriminating step of discriminating whether the added information is drawn on the foreground or background of the print document, if the settings have been input in said inputting step;

a spooling order control step of, in case of printing said added information onto the background of said print document, spooling a draw command of said added information earlier than a draw command of said print document; and a character setting changing step of, if, in spooling the draw command of said print document, the setting of a character draw command in the draw command of said print document is set to a mode in which a periphery of a character is painted white, changing said setting to a mode in which the periphery of said character is not painted white.

2. A method according to claim 1, wherein in said spooling order control step, when said added information is printed on the foreground of said print document, the draw command of said print document is spooled earlier than the draw command of said added information.

3. A method according to claim 2, wherein in said character setting changing step, when the draw command of said added information is spooled after the draw command of said print document, if the setting of the character draw command in the draw command of said added information is set to the mode in which the periphery of the character is painted white, said setting is changed to the mode in which the periphery of said character is not painted white.

4. An information processing method of adding added information to a print document formed by an application, comprising:

a discriminating step of discriminating whether the added information is drawn on the foreground or background of the print document;

a spooling order control step of, in case of printing said added information onto the background of said print document, spooling a draw command of said added information earlier than a draw command of said print document;

a character setting changing step of, in the case where the draw command of said print document is spooled and the case where the setting of a character draw command in the draw command of said print document is set to a mode in which a periphery of a character is painted white, changing said setting to a mode in which the periphery of said character is not painted white; and a mask forming step of, in the case where the draw command of said added information is spooled after the draw command of said print document and the case where said added information is bit map data, forming data for masking so that drawing contents which have already been spooled in a white area of said bit map remain in an area corresponding to said bit map, wherein in said spooling order control step, when said added information is printed on the foreground of said print document, the draw command of said print document is spooled earlier than the draw command of said added information.

5. A method according to claim 1, further comprising:

a drawing step of reading out the spooled draw commands in accordance with a spooling order and developing them as bit map data into a development memory; and an output step of forming print data for an image printer on the basis of said bit map data drawn in said drawing step and outputting said print data to said image printer.

6. A method according to claim 1, further comprising a printer driving step of reading out the spooled draw commands in accordance with a spooling order and forming print data of a printer language on the basis of said draw commands.

7. An information processing method carried out in an information processing apparatus which functions as a host computer to add added information to a print document formed by an application and to generate print data to be printed by a printer, comprising:

an inputting step of inputting, via a print setting window of a printer driver, settings of adding added information to a print document formed by the application;

a discriminating step of discriminating whether the added information is drawn on the foreground or background of the print document, if the settings have been input in said inputting step;

a spooling order control step of, in case of printing said added information onto the foreground of said print document, spooling a draw command of said print document earlier than a draw command of said added information; and a character setting changing step of, if, in spooling the draw command of said added information after the draw command of said print document, the setting of a character draw command in the draw command of said added information is set to a mode in which a periphery of a character is painted white, changing said setting to a mode in which the periphery of said character is not painted white.

8. A method according to claim 7, wherein in said spooling order control step, when said added information is printed on the background of said print document, the draw command of said added information is spooled earlier than the draw command of said print document.

9. A method according to claim 8, wherein in said character setting changing step, when the draw command of said print document is spooled, if the setting of the character draw command in the draw command of said print document is set to the mode in which the periphery of said character is painted white, said setting is changed to the mode in which the periphery of said character is not painted white.

10. An information processing method of adding added information to a print document formed by an application, comprising:

a discriminating step of discriminating whether the added information is drawn on the foreground or background of the print document;

a spooling order control step of, in case of printing said added information onto the foreground of said print document, spooling a draw command of said print document earlier than a draw command of said added information;

a character setting changing step of, in the case where the draw command of said added information is spooled after the draw command of said print document and the case where the setting of a character draw command in the draw command of said added information is set to a mode in which a periphery of a character is painted white, changing said setting to a mode in which the periphery of said character is not painted white; and a mask forming step of, in the case where the draw command of said added information is spooled after the draw command of said print document and the case where said added information is bit map data, forming data for masking so that drawing contents which have already been spooled in a white area of said bit map remain in an area corresponding to said bit map, wherein in said spooling order control step, when said added information is printed on the background of said print document, the draw command of said added information is spooled earlier than the draw command of said print document.

11. A method according to claim 7, further comprising:

a drawing step of reading out the spooled draw commands in accordance with a spooling order and developing them as bit map data into a development memory; and an output step of forming print data for an image printer on the basis of said bit map data drawn in said drawing step and outputting said print data to said image printer.

12. A method according to claim 7, further comprising a printer driving step of reading out the spooled draw commands in accordance with a spooling order and forming print data of a printer language on the basis of said draw commands.

13. A computer-readable memory medium which stores a computer program carried out in an information processing apparatus which functions as a host computer to add added information to a print document formed by an application and to generate print data to be printed by a printer, the program comprising:

an inputting step of inputting, via a print setting window of a printer driver, settings of adding added information to a print document formed by the application;

a discriminating step of discriminating whether the added information is drawn on the foreground or background of the print document, if the settings have been input in said inputting step;

a spooling order control step of, in case of printing said added information onto the background of said print document, spooling a draw command of said added information earlier than a draw command of said print document; and a character setting changing step of, if, in spooling the draw command of said print document, the setting of a character draw command in the draw command of said print document is set to a mode in which a periphery of a character is painted white, changing said setting to a mode in which the periphery of said character is not painted white.

14. A medium according to claim 13, wherein in said spooling order control step, when said added information is printed on the foreground of said print document, the draw command of said print document is spooled earlier than the draw command of said added information.

15. A medium according to claim 14, wherein in said character setting changing step, when the draw command of said added information is spooled after the draw command of said print document, if the setting of the character draw command in the draw command of said added information is set to the mode in which the periphery of the character is painted white, said setting is changed to the mode in which the periphery of said character is not painted white.

16. A computer-readable memory medium which stores a computer program for adding added information to a print document formed by an application, the program comprising:

a discriminating step of discriminating whether the added information is drawn on the foreground or background of the print document;

a spooling order control step of, in case of printing said added information onto the background of said print document, spooling a draw command of said added information earlier than a draw command of said print document;

a character setting changing step of, in the case where the draw command of said print document is spooled and the case where the setting of a character draw command in the draw command of said print document is set to a mode in which a periphery of a character is painted white, changing said setting to a mode in which the periphery of said character is not painted white, and a mask forming step of, in the case where the draw command of said added information is spooled after the draw command of said print document and the case where said added information is bit map data, forming data for masking so that drawing contents which have already been spooled in a white area of said bit map remain in an area corresponding to said bit map, wherein in said spooling order control step, when said added information is printed on the foreground of said print document, the draw command of said print document is spooled earlier than the draw command of said added information.

17. A medium according to claim 13, wherein the program further comprises:

a drawing step of reading out the spooled draw commands in accordance with a spooling order and developing them as bit map data into a development memory; and an output step of forming print data for an image printer on the basis of said bit map data drawn in said drawing step and outputting said print data to said image printer.

18. A medium according to claim 13, wherein the program further comprises a printer driving step of reading out the spooled draw commands in accordance with a spooling order and forming print data of a printer language on the basis of said draw commands.

19. A computer-readable memory medium which stores a computer program carried out in an information processing apparatus which functions as a host computer to add added information to a print document formed by an application and to generate print data to be printed by a printer, the program comprising:

an inputting step of inputting, via a print setting window of a printer driver, settings of adding added information to a print document formed by the application;

a discriminating step of discriminating whether the added information is drawn on the foreground or background of the print document, if the settings have been input in said inputting step;

a spooling order control step of, in case of printing said added information onto the foreground of said print document, spooling a draw command of said print document earlier than a draw command of said added information; and a character setting changing step of, if, in spooling the draw command of said added information after the draw command of said print document, the setting of a character draw command in the draw command of said added information is set to a mode in which a periphery of a character is painted white, changing said setting to a mode in which the periphery of said character is not painted white.

20. A medium according to claim 19, wherein in said spooling order control step, when said added information is printed on the background of said print document, the draw command of said added information is spooled earlier than the draw command of said print document.

21. A medium according to claim 20, wherein in said character setting changing step, when the draw command of said print document is spooled, if the setting of the character draw command in the draw command of said print document is set to the mode in which the periphery of said character is painted white, said setting is changed to the mode in which the periphery of said character is not painted white.

22. A computer-readable memory medium which stores a computer program for adding added information to a print document formed by an application, the program comprising:

a discriminating step of discriminating whether the added information is drawn on the foreground or background of the print document;

a spooling order control step of, in case of printing said added information onto the foreground of said print document, spooling a draw command of said print document earlier than a draw command of said added information;

a character setting changing step of, in the case where the draw command of said added information is spooled after the draw command of said print document and the case where the setting of a character draw command in the draw command of said added information is set to a mode in which a periphery of a character is painted white, changing said setting to a mode in which the periphery of said character is not painted white; and a mask forming step of, in the case where the draw command of said added information is spooled after the draw command of said print document and the case where said added information is bit map data, forming data for masking so that drawing contents which have already been spooled in a white area of said bit map remain in an area corresponding to said bit map, wherein in said spooling order control step, when said added information is printed on the background of said print document, the draw command of said added information is spooled earlier than the draw command of said print document.

23. A medium according to claim 19, wherein the program further comprises:

a drawing step of reading out the spooled draw commands in accordance with a spooling order and developing them as bit map data into a development memory; and an output step of forming print data for an image printer on the basis of said bit map data drawn in said drawing step and outputting said print data to said image printer.

24. A medium according to claim 19, wherein the program further comprises a printer driving step of reading out the spooled draw commands in accordance with a spooling order and forming print data of a printer language on the basis of said draw commands.

25. A computer program carried out in an information processing apparatus which functions as a host computer to add added information to a print document formed by an application and to generate print data to be printed by a printer, comprising:

an inputting step of inputting, via a print setting window of a printer driver, settings of adding added information to a print document formed by the application;

a discriminating step of discriminating whether the added information is drawn on the foreground or background of the print document, if the settings have been input in said inputting step;

a spooling order control step of, in case of printing said added information onto the background of said print document, spooling a draw command of said added information earlier than a draw command of said print document; and a character setting changing step of, if, in spooling the draw command of said print document, the setting of a character draw command in the draw command of said print document is set to a mode in which a periphery of a character is painted white, changing said setting to a mode in which the periphery of said character is not painted white.

26. A program according to claim 25, wherein in said spooling order control step, when said added information is printed on the foreground of said print document, the draw command of said print document is spooled earlier than the draw command of said added information.

27. A program according to claim 26, wherein in said character setting changing step, when the draw command of said added information is spooled after the draw command of said print document, if the setting of the character draw command in the draw command of said added information is set to the mode in which the periphery of the character is painted white, said setting is changed to the mode in which the periphery of said character is not painted white.

28. A computer program for adding added information to a print document formed by an application, comprising:

a discriminating step of discriminating whether the added information is drawn on the foreground or background of the print document;

a spooling order control step of, in case of printing said added information onto the background of said print document, spooling a draw command of said added information earlier than a draw command of said print document;

a character setting changing step of, in the case where the draw command of said print document is spooled and the case where the setting of a character draw command in the draw command of said print document is set to a mode in which a periphery of a character is painted white, changing said setting to a mode in which the periphery of said character is not painted white; and a mask forming step of, in the case where the draw command of said added information is spooled after the draw command of said print document and the case where said added information is bit map data, forming data for masking so that drawing contents which have already been spooled in a white area of said bit map remain in an area corresponding to said bit map, wherein in said spooling order control step, when said added information is printed on the foreground of said print document, the draw command of said print document is spooled earlier than the draw command of said added information.

29. A program according to claim 25, further comprising:

a drawing step of reading out the spooled draw commands in accordance with a spooling order and developing them as bit map data into a development memory; and an output step of forming print data for an image printer on the basis of said bit map data drawn in said drawing step and outputting said print data to said image printer.

30. A program according to claim 25, further comprising a printer driving step of reading out the spooled draw commands in accordance with a spooling order and forming print data of a printer language on the basis of said draw commands.

31. A computer program carried out in an information processing apparatus which functions as a host computer to add added information to a print document formed by an application and to generate print data to be printed by a printer, comprising:

an inputting step of inputting, via a print setting window of a printer driver, settings of adding added information to a print document formed by the application;

a discriminating step of discriminating whether the added information is drawn on the foreground or background of the print document, if the settings have been input in said inputting step;

a spooling order control step of, in case of printing said added information onto the foreground of said print document, spooling a draw command of said print document earlier than a draw command of said added information; and a character setting changing step of, if, in spooling the draw command of said added information after the draw command of said print document, the setting of a character draw command in the draw command of said added information is set to a mode in which a periphery of a character is painted white, changing said setting to a mode in which the periphery of said character is not painted white.

32. A program according to claim 31, wherein in said spooling order control step, when said added information is printed on the background of said print document, the draw command of said added information is spooled earlier than the draw command of said print document.

33. A program according to claim 32, wherein in said character setting changing step, when the draw command of said print document is spooled, if the setting of the character draw command in the draw command of said print document is set to the mode in which the periphery of said character is painted white, said setting is changed to the mode in which the periphery of said character is not painted white.

34. A computer program for adding added information to a print document formed by an application, comprising:

a discriminating step of discriminating whether the added information is drawn on the foreground or background of the print document;

a spooling order control step of, in case of printing said added information onto the foreground of said print document, spooling a draw command of said print document earlier than a draw command of said added information;

a character setting changing step of, in the case where the draw command of said added information is spooled after the draw command of said print document and the case where the setting of a character draw command in the draw command of said added information is set to a mode in which a periphery of a character is painted white, changing said setting to a mode in which the periphery of said character is not painted white; and a mask forming step of, in the case where the draw command of said added information is spooled after the draw command of said print document and the case where said added information is bit map data, forming data for masking so that drawing contents which have already been spooled in a white area of said bit map remain in an area corresponding to said bit map, wherein in said spooling order control step, when said added information is printed on the background of said print document, the draw command of said added information is spooled earlier than the draw command of said print document.

35. A program according to claim 31, further comprising:

a drawing step of reading out the spooled draw commands in accordance with a spooling order and developing them as bit map data into a development memory; and an output step of forming print data for an image printer on the basis of said bit map data drawn in said drawing step and outputting said print data to said image printer.

36. A program according to claim 31, further comprising a printer driving step of reading out the spooled draw commands in accordance with a spooling order and forming print data of a printer language on the basis of said draw commands.

* * * * *

UNITED STATES PATENT AND TRADEMARK OFFICE
CERTIFICATE OF CORRECTION

PATENT NO.    : 6,471,423 B1
DATED         : October 29, 2002
INVENTOR(S)   : Koji Yamada It is certified that error appears in the above-identified patent and that said Letters Patent is hereby corrected as shown below:

Column 4,
Line 55, "first. (Step" should read -- first. ¶ (Step -- and "document)." should read -- document) --.

Column 14,
Line 10, "white, and" should read -- white; and --.

Signed and Sealed this

Fifteenth Day of July, 2003

JAMES E. ROGAN
*Director of the United States Patent and Trademark Office*